Patented Apr. 17, 1923.

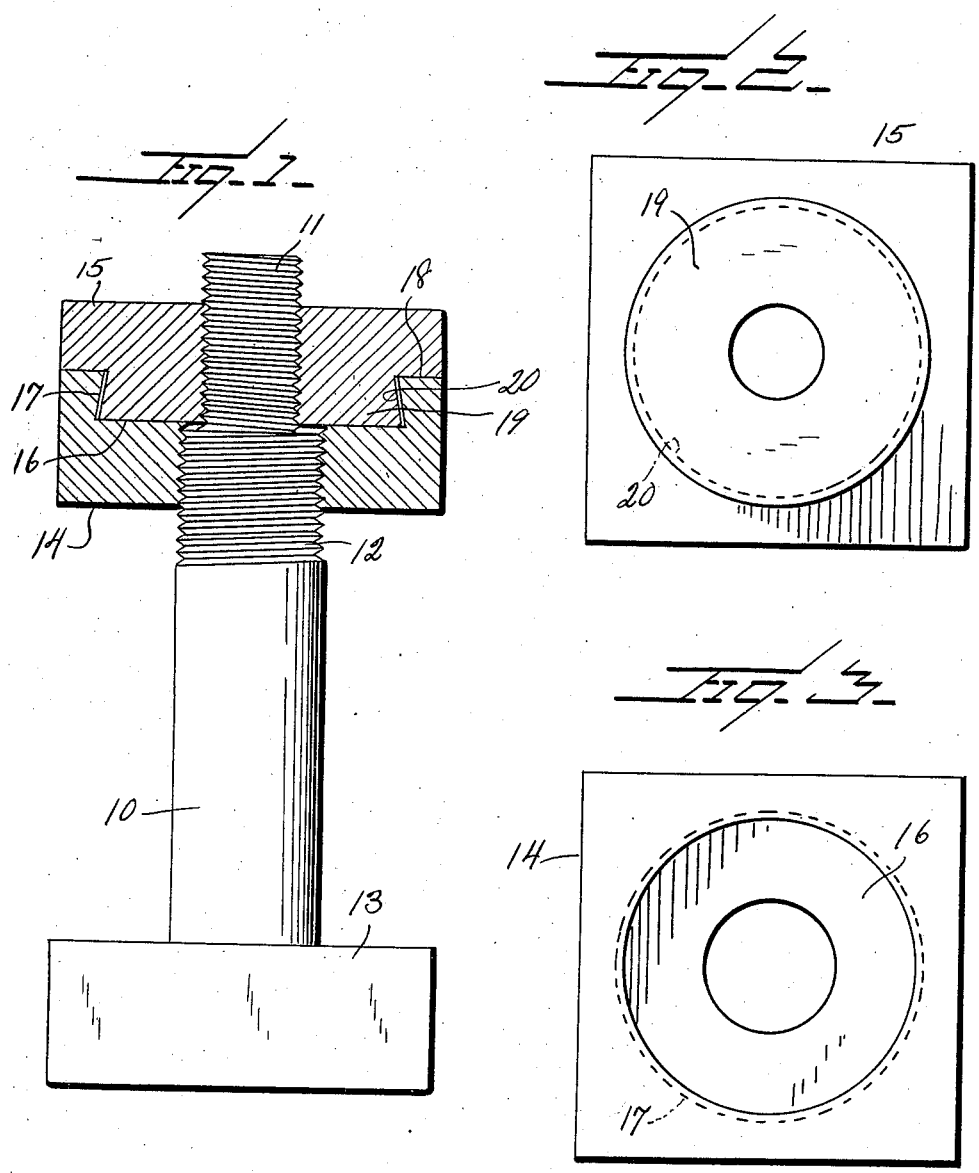

1,452,367

UNITED STATES PATENT OFFICE.

HANS ELLINGSON, OF HAMILTON, OHIO.

LOCK NUT.

Application filed August 10, 1921. Serial No. 491,183.

*To all whom it may concern:*

Be it known that I, HANS ELLINGSON, a citizen of the United States, residing at Hamilton, in the county of Butler and State of Ohio, have invented certain new and useful Improvements in Lock Nuts, of which the following is a specification, reference being had to the accompanying drawings.

This invention relates to lock nuts, and particularly to those lock nuts in which the bolt is formed with conjoined reverse threads and the nut is formed in two sections reversely threaded with relation to each other so that the outer nut section will hold the long nut section from turning off.

The general object of this invention is to provide a lock nut of this character wherein the two sections are connected to each other by a swiveled joint so that one nut section cannot be turned off unless the other nut section is also turned off, which requires, of course, that the two nut sections shall be rotated in opposite directions.

A further object is to provide a lock nut of this character which is very simple, may be cheaply made, and may be applied to a large variety of work, particularly where great strains are to be resisted.

Other objects will appear in the course of the following description.

My invention is illustrated in the accompanying drawings, wherein:—

Figure 1 is an elevation of a bolt having my improved lock nut applied thereto, the lock nut being shown in section;

Figure 2 is an inner face view of the nut section 15;

Figure 3 is an inner face view of the bolt section 14;

Referring to these figures, 10 designates a bolt, this bolt being reduced at its extremity and screw-threaded, as at 11, and the bolt inward of this reduced extremity being screw-threaded, as at 12. The threads on the reduced extremity 11 extend in a reverse direction to the threads on the portion 12. The nut, of course, is provided with a head 13 at the opposite extremity. The nut consists of two sections 14 and 15. The section 14 is formed with a threaded aperture adapted to engage the threads of the portion 12, while the section 15 is formed with a relatively small aperture fitting the portion 11 and threaded to engage therewith. Thus the nut section 14 will have to be rotated in the left hand direction, for example, in order to turn it up on the portion 12, while the nut 15 will have to be rotated in the right hand direction in order to turn it up on the section 11.

The nut section 14 and the nut section 15 are formed so that a swiveled engagement is provided between these nut sections so that they will concurrently move longitudinally but that they may be rotated in opposite directions or in the same direction with relation to each other. To this end I have illustrated the nut section 14 as being formed with a recess 16, the wall of which is concentric to the central aperture through the nut, this outer wall having an overhanging face 17. The end section 15 is cut away upon its periphery at the junction of the periphery with one face of the nut section, thereby leaving an annular recess 18 defining a central hub or boss 19. This annular recess 18 receives the marginal annular projecting portion of the nut 14. The confronting faces of the hub 19 and of the projecting annular marginal portion of the nut 14 have beveled faces, the beveled face 20 of the hub of the marginal portion of the nut 14 being complementary to the beveled face 17.

In the formation of this lock nut, the upstanding peripheral wall of the section 14 may be initially bent outward to permit the insertion of the boss 19 and then the upstanding wall forced inward so that the opposed beveled faces of the sections 14 and 15 will be engaged with each other. When this has been beveled, the section 15 has swiveled engagement with the section 14.

When the nut is put in place, that is in applying this lock nut to the bolt, the section 14 is slipped over the reduced portion 11 of the bolt until the threads of this portion 11 engage with the threads of the section 15. Then the section 15 is rotated until the section 14 is brought to the portion 12. Then the sections 14 and 15 must be rotated in opposite directions or alternately so as to turn the section 14 home and turn the section 15 home. It will be obvious now that the section 14 cannot accidentally unscrew from the bolt because it is held from longitudinal movement by the section 15 and that the section 15 cannot accidentally unscrew from the bolt because it is held from longitudinal movement by the section 14, and therefore it is only possible to remove the nut by rotating the sections 14 and 15 alternately in opposite directions. If the nut sections did not have a swiveled engagement with each other, it is obvious that while the nut would hold, yet the outer section 15 might be turned off without any more difficulty than is usually found in turning off a nut and that once the section 15 was turned off or loosened, the section 14 could be jarred loose. By swiveling the two sections, however, it is impossible to turn them off unless they are both rotated at the same time or alternately in opposite directions.

It will be seen from Figure 1 that the interior diameter of the wall of recess 16 in section 14 is slightly greater than the exterior diameter of the central boss 19 of section 15 so that a space is left between the confronting faces 17 and 20 of these two portions. This space is very important inasmuch as it permits the nut sections to be unscrewed from the nut by alternately turning the section 15 and then turning the section 14 until the two faces are in engagement with each other, and so on. If the two faces 17 and 20 were in close fitting engagement with each other at all times, then in order to unscrew the nut from the bolt it would require that the section 15 and the section 14 should be simultaneously turned in opposite directions, which it would be difficult to accomplish.

I claim:—

The combination with a bolt having a reduced threaded portion and a threaded portion adjacent the reduced threaded portion but having its threads reversed, of a nut formed in two sections, one of said sections having a threaded aperture adapted to engage with the last named threads, the outer section having a threaded aperture adapted to engage with the threads on the reduced portion, the first named nut section being formed with a recess in its outer face concentric to the central aperture and defined by a peripheral wall, the inner face of which overhangs, the second named section having a central boss smaller in diameter than the body of the section, the outer edge face of said boss extending outward at an inclination to the axis of the nut section, said central boss being disposed within the recess of the first named nut section whereby said nut sections have swiveled engagement with each other, the internal diameter of the peripheral wall of the first named section being larger than the exterior diameter of the central boss of the second named section whereby to permit the two sections of the nut to be intermittently turned to unscrew the nut as a whole from the bolt.

In testimony whereof I hereunto affix my signature.

HANS ELLINGSON.